(12) United States Patent
Chang et al.

(10) Patent No.: US 7,200,360 B1
(45) Date of Patent: *Apr. 3, 2007

(54) COMMUNICATION SYSTEM AS A SECONDARY PLATFORM WITH FREQUENCY REUSE

(75) Inventors: Donald C. D. Chang, Thousand Oaks, CA (US); Weizheng Wang, Rancho Palos Verdes, CA (US); Wah Lim, Santa Ana, CA (US); Ying Feria, Manhattan Beach, CA (US); Ming U. Chang, Rancho Palos Verdes, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 1100 days.

This patent is subject to a terminal disclaimer.

(21) Appl. No.: 09/594,374

(22) Filed: Jun. 15, 2000

(51) Int. Cl.
H04B 7/185 (2006.01)

(52) U.S. Cl. .................... 455/13.1; 455/447; 455/63.3; 455/427

(58) Field of Classification Search .................... 455/7, 455/11.1, 12.1, 13.1, 13.2, 13.3, 448, 446, 455/447, 431, 427, 429
See application file for complete search history.

(56) References Cited

U.S. PATENT DOCUMENTS

| | | | |
|---|---|---|---|
| 4,085,368 A | 4/1978 | Yeh | |
| 4,236,161 A | 11/1980 | Ohm | |
| 4,689,625 A | 8/1987 | Barmat | |
| 4,819,227 A | 4/1989 | Rosen | |
| 4,823,341 A | 4/1989 | Rosen | |
| 5,206,658 A | 4/1993 | Wokurka | |
| 5,303,286 A | 4/1994 | Wiedeman | |
| 5,444,449 A | 8/1995 | Poskett et al. | |
| 5,555,257 A | 9/1996 | Dent | |
| 5,584,047 A * | 12/1996 | Tuck | 455/13.1 |
| 5,592,481 A | 1/1997 | Wiedeman et al. | |
| 5,594,941 A | 1/1997 | Dent | |
| 5,612,701 A | 3/1997 | Diekelman | |
| 5,678,174 A | 10/1997 | Tayloe | |
| 5,732,351 A | 3/1998 | Olds et al. | |
| 5,790,070 A | 8/1998 | Natarajan et al. | |
| 5,894,590 A | 4/1999 | Vatt et al. | |
| 5,903,549 A | 5/1999 | Von der Embse et al. | |
| 5,946,603 A | 8/1999 | Ibanez-Meier et al. | |

(Continued)

FOREIGN PATENT DOCUMENTS

DE 19629 744 A 2/1997

(Continued)

OTHER PUBLICATIONS

Colella N J et al., "The Halo Network ™", IEEE Communications Magazine, IEEE Service Center, Piscataway, N.J. U.S., vol. 38, no. 6, Jun. 2000, pp. 142-148, XP 000932657, ISSN: 0163-6804.

(Continued)

*Primary Examiner*—Temica Beamer
(74) *Attorney, Agent, or Firm*—Georgann S. Grunebach

(57) ABSTRACT

A communications system (10) and method of operating the communications system includes a first stratospheric platform generating a second beam having a frequency the same as a satellite beam to the same service area. User terminals are configured to receive the first beam or the second beam.

16 Claims, 3 Drawing Sheets

U.S. PATENT DOCUMENTS

| | | | |
|---|---|---|---|
| 5,949,766 | A | 9/1999 | Ibanez-Meier et al. |
| 5,966,371 | A | 10/1999 | Sherman |
| 5,974,317 | A | 10/1999 | Djuknic et al. |
| 5,974,324 | A | 10/1999 | Henson |
| 5,990,928 | A | 11/1999 | Sklar et al. |
| 6,002,935 | A | 12/1999 | Wang |
| 6,019,318 | A | 2/2000 | Cellier et al. |
| 6,023,463 | A | 2/2000 | Wiedeman et al. |
| 6,040,798 | A | 3/2000 | Kinal et al. |
| 6,047,186 | A | 4/2000 | Yu et al. |
| 6,061,562 | A | 5/2000 | Martin et al. |
| 6,088,341 | A | 7/2000 | Hinedi et al. |
| 6,105,060 | A | 8/2000 | Rothblatt |
| 6,125,261 | A | 9/2000 | Anselmo et al. |
| 6,126,116 | A | 10/2000 | Cellier |
| 6,138,012 | A | 10/2000 | Krutz et al. |
| 6,151,308 | A | 11/2000 | Ibanez-Meier et al. |
| 6,157,811 | A | 12/2000 | Dent |
| 6,160,994 | A | 12/2000 | Wiedeman |
| 6,167,263 | A * | 12/2000 | Campbell .................. 455/431 |
| 6,169,910 | B1 | 1/2001 | Tamil et al. |
| 6,173,178 | B1 | 1/2001 | Hammill et al. |
| 6,178,328 | B1 | 1/2001 | Tang et al. |
| 6,188,896 | B1 | 2/2001 | Perahia et al. |
| 6,205,320 | B1 | 3/2001 | Coleman |
| 6,208,626 | B1 | 3/2001 | Brewer |
| 6,215,776 | B1 | 4/2001 | Chao |
| 6,236,834 | B1 | 5/2001 | Poskett et al. |
| 6,257,526 | B1 | 7/2001 | Taormina et al. |
| 6,259,913 | B1 | 7/2001 | Noreils et al. |
| 6,295,440 | B2 | 9/2001 | Chang et al. |
| 6,311,068 | B1 | 10/2001 | Leung et al. |
| 6,317,412 | B1 | 11/2001 | Natali et al. |
| 6,317,420 | B1 | 11/2001 | Schiff |
| 6,324,381 | B1 | 11/2001 | Anselmo et al. |
| 6,324,398 | B1 | 11/2001 | Lanzerotti et al. |
| 6,325,332 | B1 | 12/2001 | Cellier et al. |
| 6,327,523 | B2 | 12/2001 | Cellier |
| 6,333,924 | B1 | 12/2001 | Porcelli et al. |
| 6,336,612 | B1 | 1/2002 | Taormina et al. |
| 6,337,980 | B1 | 1/2002 | Chang et al. |
| 6,339,708 | B1 | 1/2002 | Wang |
| 6,388,615 | B1 | 5/2002 | Chang et al. |
| 6,389,336 | B2 | 5/2002 | Cellier |
| 6,434,384 | B1 | 8/2002 | Norin et al. |
| 6,460,808 | B2 | 10/2002 | Taormina et al. |
| 6,567,052 | B1 | 5/2003 | Wang et al. |
| 6,622,006 | B1 * | 9/2003 | Wang et al. ............... 455/12.1 |
| 6,725,013 | B1 * | 4/2004 | Chang et al. ............... 455/13.1 |
| 6,731,931 | B1 * | 5/2004 | Grayson et al. ............ 455/430 |
| 2001/0000167 | A1 | 4/2001 | Chang et al. |
| 2002/0006795 | A1 | 1/2002 | Norin |
| 2002/0041575 | A1 | 4/2002 | Karabinis et al. |

FOREIGN PATENT DOCUMENTS

| | | |
|---|---|---|
| EP | 0 549 220 A | 6/1993 |
| EP | 0 748 062 A | 12/1996 |
| EP | 0 887 951 A2 | 12/1998 |
| EP | 1 037 403 A2 | 9/2000 |
| EP | 1 139 583 A2 | 10/2001 |
| EP | 1 148 662 A2 | 10/2001 |
| EP | 1 158 698 A2 | 11/2001 |
| JP | 59-097239 | 6/1984 |
| JP | 08-331030 | 12/1996 |
| WO | WO 90/13186 | 11/1990 |
| WO | WO 96 31016 A | 10/1996 |
| WO | WO 97 07609 A | 2/1997 |
| WO | WO 9851568 A | 11/1998 |
| WO | WO 99 13598 A | 3/1999 |
| WO | WO 99/23769 A | 5/1999 |
| WO | WO 00/41340 | 7/2000 |
| WO | WO 01/91310 A2 | 11/2001 |
| WO | WO 01/64969 A2 | 12/2001 |
| WO | WO 01/93458 A2 | 12/2001 |
| WO | WO 01/95520 A2 | 12/2001 |
| WO | WO 01/97388 A2 | 12/2001 |

OTHER PUBLICATIONS

U.S. Appl. No. 09/612,465, filed Jul. 7, 2000, Wang et al.
U.S. Appl. No. 09/594,375, filed Jun. 15, 2000, Chang et al.
U.S. Appl. No. 09/649,355, filed Aug. 28, 2000, Hagen et al.
K. K. Chan, et al., "A Circularly Polarized Waveguide Array for Leo Satellite Communications", Antennas and Propagation Society, 1999, IEEE International Symposium, vol. 1, Jul. 11-16, 1999, pp. 154-157.
M. Oodo, et al., "Onboard DBF Antenna for Stratospheric Platform", 2000 IEEE International Conference on Phased Array Systems and Technology, Proceedings, May 21-25, 2000, pp. 125-128.
R. Suzuki, et al., "Mobile TDM/TDMA System With Active Array Antenna", Global Telecommunications Conference, 1991; GLOBECOM '91; Dec. 2-5, 1991, pp. 1569-1573, vol. 3.
Yokosuka Research Park, "The First Stratospheric Platform Systems Workshop", May 12-13, 1999, pp. 1-216.
Colella, Nicholas J. et al., "High Speed Internet Access via Stratospheric HALO Aircraft", INET 99 Proceedings, Internet Society, Technology, Wireless, 13 pages, Jun. 8, 1999.

* cited by examiner

COMMUNICATION SYSTEM AS A SECONDARY PLATFORM WITH FREQUENCY REUSE

RELATED APPLICATION

The present application is related to U.S. patent application Ser. No. 09/594,375 entitled "Communication System Having Frequency Reuse In Non-Blocking Manner", now U.S. Pat. No. 6,725,013, filed simultaneously herewith and incorporated by reference hereby.

TECHNICAL FIELD

The present invention relates generally to communications systems, and more particularly, to a system allowing frequency reuse with existing systems.

BACKGROUND ART

In this communication age, content providers are increasingly investigating ways in which to provide more content to users as well as interfacing with users.

Communication satellites have become commonplace for use in many types of communication services, e.g., data transfer, voice communications, television spot beam coverage, and other data transfer applications. As such, satellites transmit and receive large amounts of signals used in either a "bent pipe" or "spot array" configuration to transmit signals to desired geographic locations on the Earth.

Because the frequency of resources are scarce for over-the-air transmission, various encoding schemes are used to provide a greater number of communication signals within an allocated communication band spectrum. Such encoding schemes include code division multiple access (CDMA), time division multiple access (TDMA), frequency division multiple access (FDMA), or combination of these schemes. Further, to prevent interference the schemes may operate at various frequencies.

There is a continual need to provide new systems. However, if no spectrum is available typically potential system operators must forgo a pursuing a system.

It would therefore be desirable to provide a system that allows reuse of frequency spectrums allocated to other users.

SUMMARY OF THE INVENTION

It is therefore one object of the invention to provide an improved communications system that allows frequency reuse. Another object of the invention is to provide a low cost communication system.

In one aspect of the invention, a method for operating a communication system comprises the steps of:

generating a first beam using a first frequency directed at a service area with a satellite; and generating a second beam using the first frequency directed at the service area from a stratospheric platform.

In a further aspect of the invention, a communications system has a first stratospheric platform generating a beam having the same frequency as a satellite beam in the same area. User terminals are configured to receive the beam from the satellite and from the stratospheric platform.

One advantage of the invention is that the user terminals for existing systems may be reused. Another advantage of the system is that several users platforms reusing the same frequency spectrum may be used.

Other objects and features of the present invention will become apparent when viewed in light of the detailed description of the preferred embodiment when taken in conjunction with the attached drawings and appended claims.

BEST MODES FOR CARRYING OUT THE INVENTION

Figure 1:
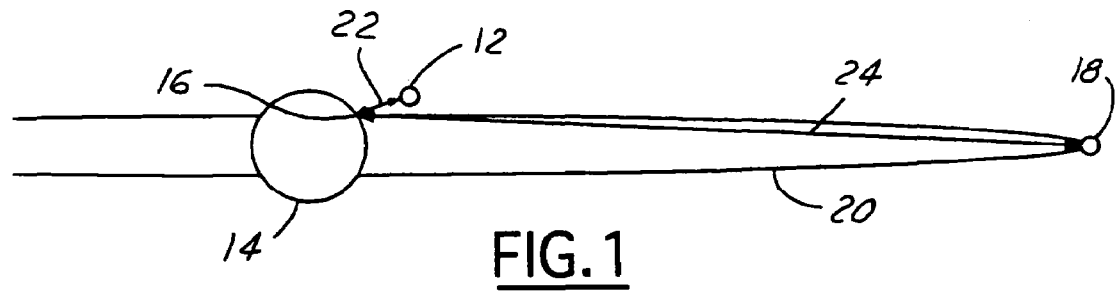
FIG. 1 is a high level system diagram relative of a preferred embodiment in the invention to the Earth of a preferred embodiment in the invention.

In the following figures the same reference numerals are used to identify the same components in the various views.

The present invention is applicable to many communications systems including various mobile, fixed, point-to-point broadcast and other types of communications.

Referring now to FIG. 1, the present invention is a communications system 10 that employs a stratospheric platform 12 positioned above Earth 14. Stratospheric platform 12 communicates with a user 16 positioned on Earth 14. A geosynchronous satellite 18 having a geosynchronous orbit 20 is also illustrated. The geosynchronous orbit 20 allows the geosynchronous satellite 18 to maintain a relatively fixed position above a particular point on the Earth. Although only one stratospheric platform 12 and one geosynchronous orbit satellite 18 are illustrated, the present invention may include several of each.

As illustrated, the line of sight 22 of stratospheric platform 12 has a significantly different elevation angle than line-of-sight 24. As will be illustrated below, the line-of-sight corresponds to different elevation angles relative to user 16. The difference in line-of-sights 22,24 allows frequency reuse between geosynchronous satellite 18 and stratospheric platform 12.

Stratospheric platform 12 may comprise one of many types of proposed stratosphere based devices such as unmanned plane, balloons, dirigibles or the like. Stratospheric platform 12 preferably may also comprise a stratosphere-based platform such as those under development by AeroVironment. Helios is one such project being developed by AeroVironment. The Helios stratospheric platform is an unmanned vehicle that can fly for several months at an altitude of about 60,000 feet above the Earth. Helios is a solar powered electric plane that is modular in design and may be configured to carry a variety of payloads. Stratospheric platforms also deploy relatively rapidly compared to satellites and thus, if the need increases, the system capability may be increased or modified.

Figure 2:
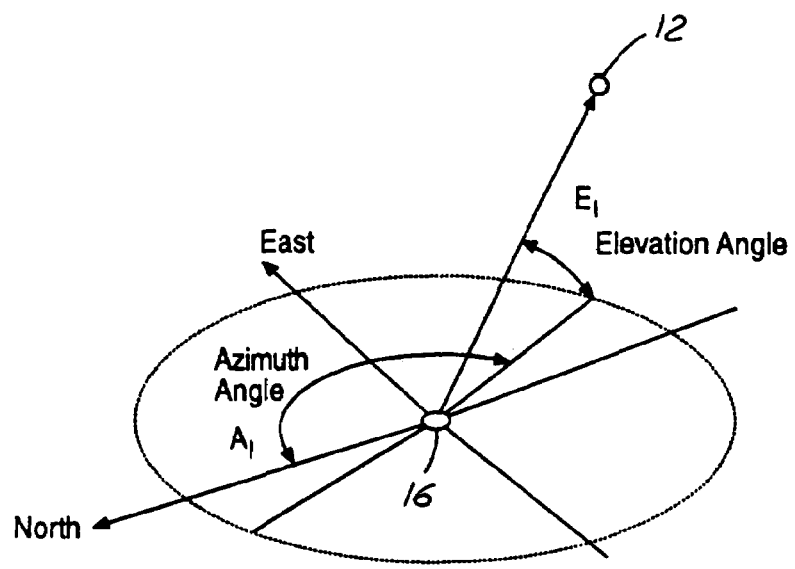
FIG. 2 is a plot illustrating various angles of the satellite systems according to FIG. 1.

Referring now to FIG. 2, stratospheric platform 12 is illustrated having an elevation angle $E_1$ with respect to the user 16. Also, the azimuth angle $A_1$ of stratospheric platform 12 is also illustrated. Azimuth angle $A_1$ is the angle from north. Although different, the azimuth angle and elevation angle for a satellite 18 is equally applicable. Of course, the elevation angle and azimuth angle for stratospheric platform 12 will vary depending on its location that may vary depending on the stratospheric platform 12. Of course, the height of the stratospheric platform must also be taken in consideration.

Figure 3:
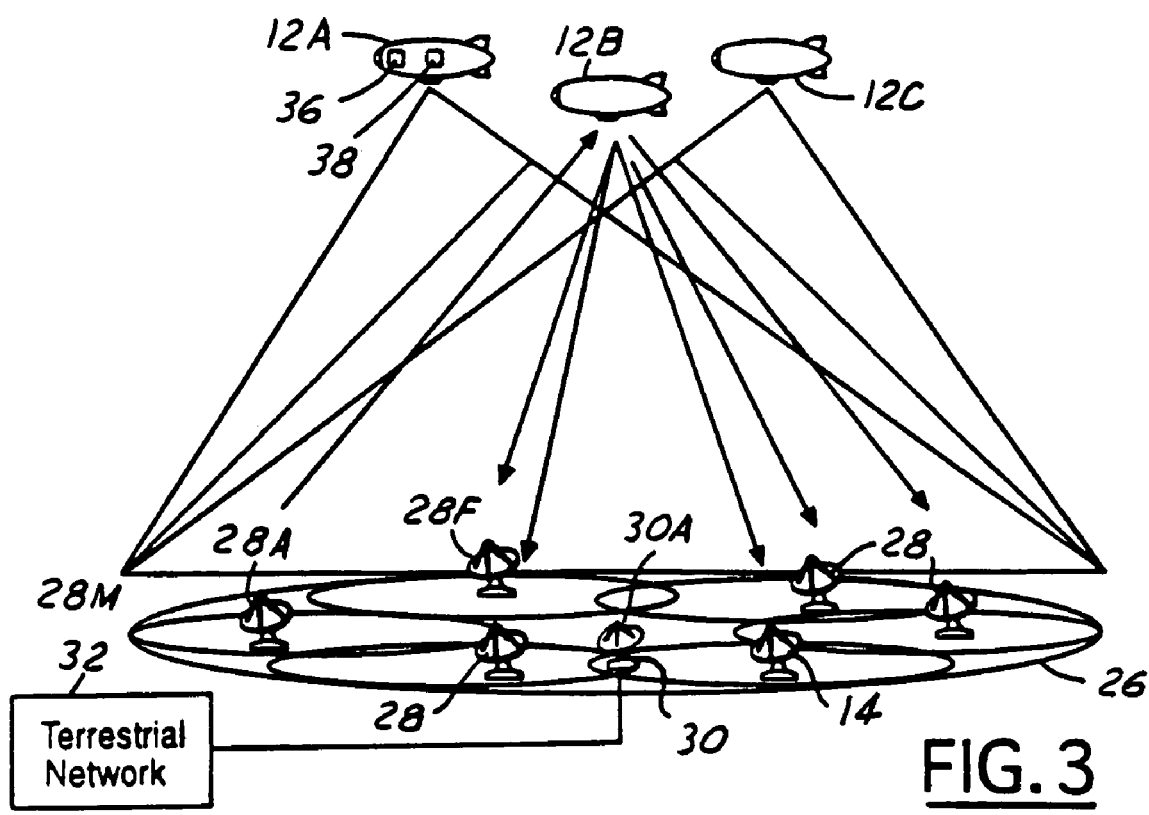
FIG. 3 is a system diagram of a preferred embodiment in the invention.

Referring now to FIG. 3, communications system 10 having a plurality of platforms 12A, 12B and 12C is used to cover a predetermined service area 26 on the Earth's surface. Although three are used for illustrative purposes, only one is required. A plurality of user terminals 28 are used to illustrate mobile users and fixed users respectively. Mobile user terminals 28M may comprise but are not limited to automotive applications, personal digital assistant applications, and cellular phone applications. Fixed user terminals 28F may, for example, comprise business-based or home-based communications systems. Each user terminal 28F, 28M may receive a signal with a predetermined signal strength or receive an antenna radiation spot in a spot beam pattern that is available from and provided by stratospheric platform 12.

Communications system 10 further includes a gateway station 30 that is coupled to terrestrial networks 32 and a device operations center 34. Both gateway station 30 and device operations center 34 are in communication with platforms 12. Gateway station 30 provides a link between user terminals 28F, 28M and terrestrial networks 32 through stratospheric platform 12.

Device operations center 34 provides command and control functions to platforms 12A–12C. Although illustrated as two separate units, gateway station 30 and device operations center 34 may be combined into the same physical location.

The platforms 12A–12C are used as a communications node for gateway station 30 and user terminals 28M and 28F, each of which have antennas that are pointed in the direction of the platform. The gateway antenna 30A of gateway station 30 and user terminal antennas 28A has a beam width wide enough to maintain communication links with platform 12 throughout the flight path. The antennas 28A, 30A allow for large data throughput.

Platforms 12A–C each have a controller 36 that is used to control communications with the user terminals 28F, 28M. In the present invention, the controller 36 is used to generate a plurality of beams as is discussed below. The frequency of the beams may be within the spectrum of a geostationary satellite. Various numbers of users may communicate within a beam.

Controller 36 may be a secondary payload for the platforms. That is, to reduce system expense, the controllers 36 may be secondary to a primary controller 38 for another type of system already carried on the platform. The selective size and weight of controller 36 relative to controller 38 may be kept small to reduce the burden on platform 12.

Figure 4:
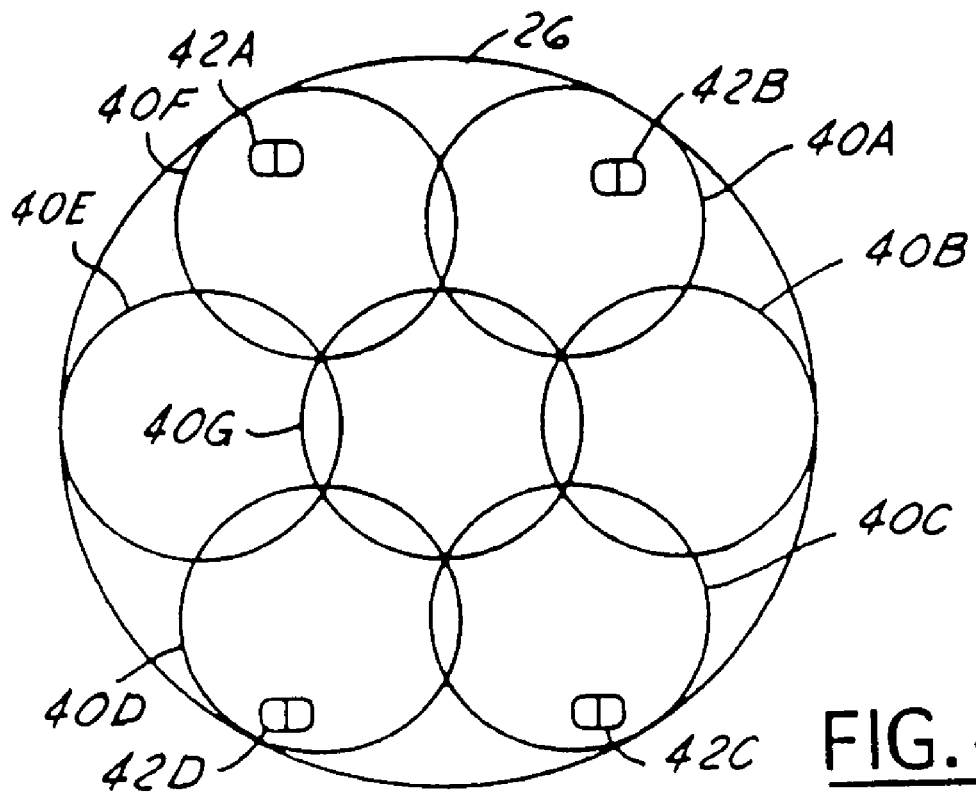
FIG. 4 is a plot of seven spot beams using three-color frequency reuse.

Referring now to FIG. 4, a plurality of beams 40A–40G are illustrated as approximately circular in area 26. The circular area 26 defines an outer boundary defined where an interference level is tolerable. For example, the beams 40A–40G may be approximated at the 20-dB side load contour. As illustrated, three colors are used in the seven spot beams. That is, the center beam 40G is one frequency. Beams 40A, C, and E have a different frequency than beams 40B, D, F. Beams 40A–40F have a different frequency than beam 40G. In one preferred embodiment of the invention, the area 26 is preferably about 45 kilometers.

Gateway stations 42A–44D use one of the communications frequencies of beams 40A–40G to communicate with the platform 12.

Figure 5:
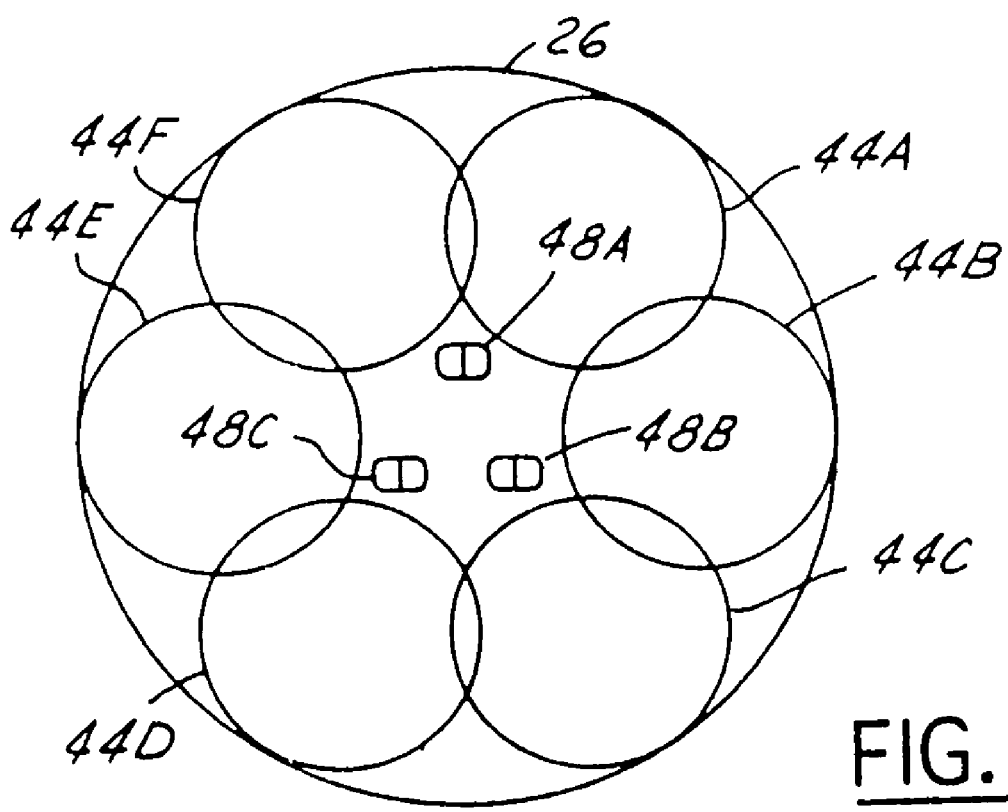
FIG. 5 is a plot of six spot beams with two-color reuse.

Referring now to FIG. 5, two frequencies are used. That is, beams 44A, 44C, and 44E have a different frequency than beams 44B, 44D, and 44F. As was illustrated in FIG. 4, the center beam frequency is different than the outer frequencies. Therefore, an inefficiency in the system exists. It is therefore more efficient to remove the center beam frequency and provide the gateway stations therein. In this manner, only two frequencies need be provided. Thus, the bandwidth of each channel may be extended. By providing the "hole" in the coverage, the highest system throughput may be obtained. In this manner, only three gateway stations 48A, 48B, and 48C are required.

In one design configuration, broadband communication throughput is between about 1.75 to 3 GHz, because the payload is piggy-backed onto another application. This amount of throughput may be used to support a substantial number of users while maintaining low cost. For example, an $E_1$ line requires a data rate of 512 Kbps. In this manner, each platform may support 5600 users. If ten platforms are used and assuming a statistic factor of 100, the number of system users may approach 5.6 million.

In operation, the user terminals 28 preferably have directional antennas that allow pointing at different platforms 12. Both user links and feeder links share spectrum. Also, asymmetric track is used on forward links and return links. Advantageously, the spectrum for existing communications is reused which allows user terminals to be also reused, the implementation of such a system is believed to require a sufficiently lower cost than an independent frequency. This system may be used to augment existing geostationary applications. Also, the present application may also be used in a non-blocking manner to prevent the stratospheric platform from interfering with communications from the geostationary satellite. That is, signals in areas of conflict may not be broadcast.

While particular embodiments of the invention have been shown and described, numerous variations alternate embodiments will occur to those skilled in the art. Accordingly, it is intended that the invention be limited only in terms of the appended claims.

What is claimed is:

1. A communication system for use with geosynchronous satellite systems broadcasting a first beam at a first frequency comprising:
   a first stratospheric platform generating a second beam having the first frequency;
   a second stratospheric platform generating a third beam having the first frequency; and
   user terminals configured to receive the first beam, the second beam and the third beam.

2. A system as recited in claim 1 wherein user terminals comprise directional antennas.

3. A system as recited in claim 1 wherein the second beam is generated from a secondary payload.

4. A communication system for use with geosynchronous satellite systems broadcasting a first beam at a first frequency comprising:
   a first stratospheric platform having a primary payload and a secondary payload, said secondary payload generating communication signals having the first frequency.

5. A system as recited in claim 4 further comprising a second stratospheric platform generating a third beam having the first frequency.

6. A method for operating a communications system comprising the steps of:
   generating a first beam using a first frequency directed at a service area with a satellite;

generating a second beam using the first frequency directed at the service area from a first stratospheric platform; and generating a third beam using the first frequency directed at the service area from a second stratospheric platform.

7. A method as recited in claim 6 wherein said step of generating a second beam comprises the step of generating a second beam from a secondary payload.

8. A method as recited in claim 6 wherein said satellite comprises a geostationary satellite.

9. A method as recited in claim 6 further comprising the step of generating a feeder link with the first frequency.

10. A system as recited in claim 1 further comprising a gateway station generating a feeder link using the first frequency.

11. A communication system for use with geosynchronous satellite systems broadcasting a first beam at a first frequency range comprising:

a first stratospheric platform generating a second beam, a plurality of third beams and a plurality of fourth beams each within the first frequency range within a service area, said plurality of third beams and said plurality of fourth beams alternately arranged around the second beam in a center position to provide a three color rouse scheme;

user terminals configured to receive beams in the first frequency range.

12. A system as recited in claim 11 wherein user terminals comprise directional antennas.

13. A system as recited in claim 11 wherein the second beam is generated from a secondary payload.

14. A communication system for use with geosynchronous satellite systems broadcasting a first beam at a first frequency range comprising:

a first stratospheric platform generating a plurality second beams and a plurality of third beams each within the first frequency range and a service area, said plurality of second beams and said plurality of third beams alternately arranged around a central hole;

a gateway station positioned within the hole in the service area;

user terminals configured to receive beams in the first frequency range.

15. A system as recited in claim 14 wherein user terminals comprise directional antennas.

16. A system as recited in claim 14 wherein the plurality of second beams are generated from a secondary payload.

* * * * *